(12) United States Patent
Honma et al.

(10) Patent No.: US 11,937,069 B2
(45) Date of Patent: Mar. 19, 2024

(54) AUDIO SYSTEM, AUDIO REPRODUCTION APPARATUS, SERVER APPARATUS, AUDIO REPRODUCTION METHOD, AND AUDIO REPRODUCTION PROGRAM

(71) Applicant: Sony Group Corporation, Tokyo (JP)

(72) Inventors: Hiroyuki Honma, Chiba (JP); Toru Chinen, Kanagawa (JP); Yoshiaki Oikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 17/423,854

(22) PCT Filed: Dec. 11, 2019

(86) PCT No.: PCT/JP2019/048428
§ 371 (c)(1),
(2) Date: Jul. 16, 2021

(87) PCT Pub. No.: WO2020/153027
PCT Pub. Date: Jul. 30, 2020

(65) Prior Publication Data
US 2022/0086587 A1    Mar. 17, 2022

(30) Foreign Application Priority Data
Jan. 24, 2019    (JP) ................. 2019-009921

(51) Int. Cl.
*H04S 7/00*     (2006.01)
*G06F 3/16*     (2006.01)
(Continued)

(52) U.S. Cl.
CPC .............. *H04S 7/303* (2013.01); *G06F 3/165* (2013.01); *G06V 40/161* (2022.01);
(Continued)

(58) Field of Classification Search
None
See application file for complete search history.

(56) References Cited

U.S. PATENT DOCUMENTS

| 9,591,427 B1 * | 3/2017 | Lyren ...................... G06F 3/013 |
| 10,028,070 B1 * | 7/2018 | Gamper .................. H04S 7/302 |

(Continued)

FOREIGN PATENT DOCUMENTS

| CN | 101116374 A | 1/2008 |
| CN | 103455824 A | 12/2013 |

(Continued)

OTHER PUBLICATIONS

International Search Report and English translation thereof dated Feb. 10, 2020 in connection with International Application No. PCT/JP2019/048428.

*Primary Examiner* — Qin Zhu
(74) *Attorney, Agent, or Firm* — Wolf, Greenfield & Sacks, P.C.

(57) ABSTRACT

An audio system includes: a face data detection unit that detects face data on the basis of input image data; an acoustic coefficient acquisition unit that outputs an acoustic coefficient associated with face data output from the face data detection unit; and an acoustic coefficient application unit that performs, on an audio signal, acoustic processing based on an acoustic coefficient acquired by the acoustic coefficient acquisition unit.

14 Claims, 6 Drawing Sheets

(51) Int. Cl.
 *G06V 40/16* (2022.01)
 *H04S 3/00* (2006.01)
(52) U.S. Cl.
 CPC ........ *G06V 40/172* (2022.01); *H04S 2400/11* (2013.01); *H04S 2420/01* (2013.01)

(56) References Cited

U.S. PATENT DOCUMENTS

| | | |
|---|---|---|
| 2011/0235807 A1 | 9/2011 | Hayashi et al. |
| 2013/0169779 A1 | 7/2013 | Pedersen |
| 2015/0319550 A1 | 11/2015 | Fujita |
| 2018/0270603 A1* | 9/2018 | Gamper ................. H04R 5/033 |
| 2018/0310115 A1* | 10/2018 | Romigh ................. H04S 3/008 |
| 2018/0352359 A1* | 12/2018 | Edry ....................... H04L 67/10 |
| 2020/0368616 A1* | 11/2020 | Delamont ............... A63F 13/65 |
| 2021/0005213 A1* | 1/2021 | Goldstein ............... G10L 21/06 |

FOREIGN PATENT DOCUMENTS

| | | |
|---|---|---|
| CN | 104885483 A | 9/2015 |
| CN | 108476358 A | 8/2018 |
| CN | 108885690 A | 11/2018 |
| JP | 2003-125499 A | 4/2003 |
| JP | 2006-115442 A | 4/2006 |
| JP | 2010-245946 A | 10/2010 |
| JP | 2011-223549 A | 11/2011 |
| JP | 2013-168924 A | 8/2013 |
| JP | 2014-099797 A | 5/2014 |
| JP | 2014-131140 A | 7/2014 |
| JP | 2015-228571 A | 12/2015 |
| JP | 2017-034350 A | 2/2017 |
| JP | 2017-143468 A | 8/2017 |

\* cited by examiner

Personalized acoustic coefficient recalculation processing

AUDIO SYSTEM, AUDIO REPRODUCTION APPARATUS, SERVER APPARATUS, AUDIO REPRODUCTION METHOD, AND AUDIO REPRODUCTION PROGRAM

CROSS-REFERENCE TO RELATED APPLICATIONS

This application claims the benefit under 35 U.S.C. § 371 as a U.S. National Stage Entry of International Application No. PCT/JP2019/048428, filed in the Japanese Patent Office as a Receiving Office on Dec. 11, 2019, which claims priority to Japanese Patent Application Number JP2019-009921, filed in the Japanese Patent Office on Jan. 24, 2019, each of which is hereby incorporated by reference in its entirety.

TECHNICAL FIELD

The present disclosure relates to an audio system, an audio reproduction apparatus, a server apparatus, an audio reproduction method, and an audio reproduction program.

BACKGROUND ART

Currently, a technology that reproduces a desired sound field by using a plurality of speakers is known. Such a sound field reproduction technology can realize a three-dimensional acoustic space. Patent Literature 1 has disclosed an acoustic control apparatus capable of achieving a desired acoustic effect by using a head-related transfer function.

CITATION LIST

Patent Literature

Patent Literature 1: Japanese Patent Application Laid-open No. 2015-228571

DISCLOSURE OF INVENTION

Technical Problem

In such fields, it is desirable to realize a sound field suitable for a user. It is an object of the present disclosure to provide an audio system, an audio reproduction apparatus, a server apparatus, an audio reproduction method, and an audio reproduction program that realize a sound field suitable for a user.

Solution to Problem

The present disclosure is, for example, an audio system including:
a face data detection unit that detects face data on the basis of input image data;
an acoustic coefficient acquisition unit that outputs an acoustic coefficient associated with face data output from the face data detection unit; and
an acoustic coefficient application unit that performs, on an audio signal, acoustic processing based on an acoustic coefficient acquired by the acoustic coefficient acquisition unit.

The present disclosure is, for example, an audio reproduction apparatus including:
a face data detection unit that detects face data on the basis of the input image data; and
an acoustic coefficient application unit that performs, on an audio signal, acoustic processing based on an acoustic coefficient associated with the face data.

The present disclosure is, for example, a server apparatus including:
a reception unit that receives face data transmitted from an audio reproduction apparatus; and
an acoustic coefficient acquisition unit that outputs the face data; in which
the server apparatus transmits an acoustic coefficient output by the acoustic coefficient acquisition unit to the audio reproduction apparatus.

The present disclosure is, for example, an audio reproduction method including:
face data detection processing of detecting face data on the basis of input image data; and
acoustic coefficient application processing of performing, on an audio signal, acoustic processing based on an acoustic coefficient associated with the face data.

The present disclosure is, for example, an audio reproduction program that causes an information processing apparatus to perform:
face data detection processing of detecting face data on the basis of input image data; and
acoustic coefficient application processing of performing, on an audio signal, acoustic processing based on an acoustic coefficient associated with the face data.

MODE(S) FOR CARRYING OUT THE INVENTION

Hereinafter, an embodiment and the like of the present disclosure will be described with reference to the drawings. It should be noted that descriptions will be given in the following order.

1. Description of General Technologies

2. Embodiment

The embodiment and the like to be described below are favorable specific examples of the present disclosure and the contents of the present disclosure are not limited to the embodiment.

1. Description of General Technologies

An object-based audio technology has been used in movies, games, and the like and encoding techniques that can handle the object-based audio have also been developed. For example, MPEG standards that are the international standards and the like are known.

In such an encoding technique, with the conventional two-channel stereo technique or multi-channel stereo technique such as 5.1 channel, a moving sound source or the like can be handled as an independent audio object and position information of the object can be encoded as metadata with signal data of the audio object. By doing so, reproduction can be performed in various viewing environments in which the number and arrangement of speakers are different, and it is possible to easily process a particular sound source, which has been difficult in the conventional encoding technique, at the time of reproduction (e.g., volume control, addition of an effect, or the like).

Figure 1:
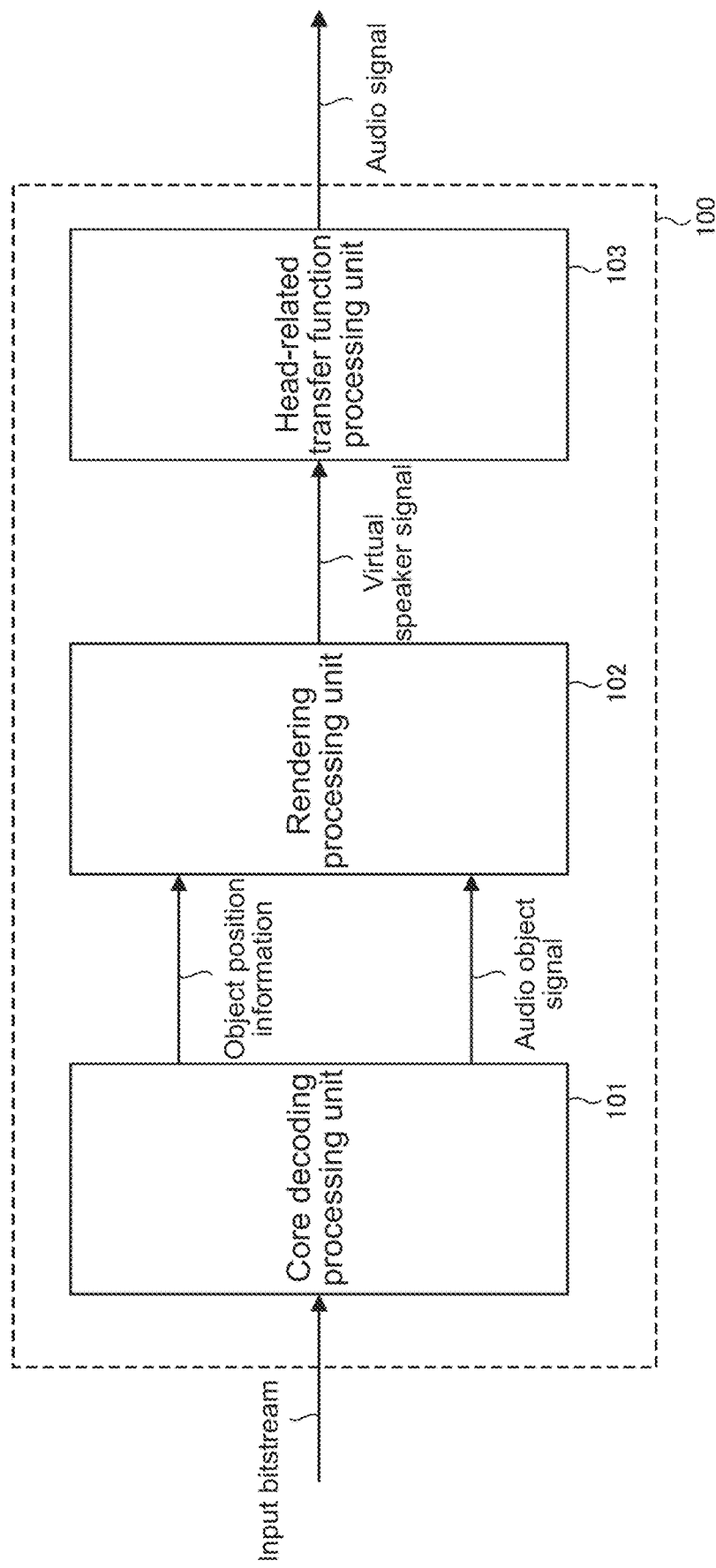
FIG. 1 is a block diagram showing a configuration of a general reproduction apparatus.

FIG. 1 is a block diagram showing a configuration of a general reproduction apparatus 100. The reproduction apparatus 100 includes a core decoding processing unit 101, a rendering processing unit 102, and a head-related transfer function processing unit 103. The core decoding processing unit 101 decodes an input bit stream externally input, and outputs an audio object signal and metadata including object position information and the like. Here, the object is one or more of sound sources constituting an audio signal to be reproduced, the audio object signal corresponds to an audio signal emitted from the sound source, and the object position information corresponds to the position of an object that is the sound source.

Based on the decoded audio object signal and the object position information, the rendering processing unit 102 performs rendering processing on speakers disposed in a virtual space and outputs a virtual speaker signal in which a sound field in the virtual space is reproduced. The head-related transfer function processing unit 103 applies a general head-related transfer function to the virtual speaker signal and outputs an audio signal for headphones or speaker reproduction.

Here, it is known that a technique called three-dimensional vector based amplitude panning (VBAP) is used in the rendering processing unit 102. It is one of rendering techniques generally called panning and is a technique of performing rendering by distributing gains to three speakers of speakers present on a spherical surface having a viewing position as an origin, which are closest to an audio object also present on the spherical surface.

Figure 2:
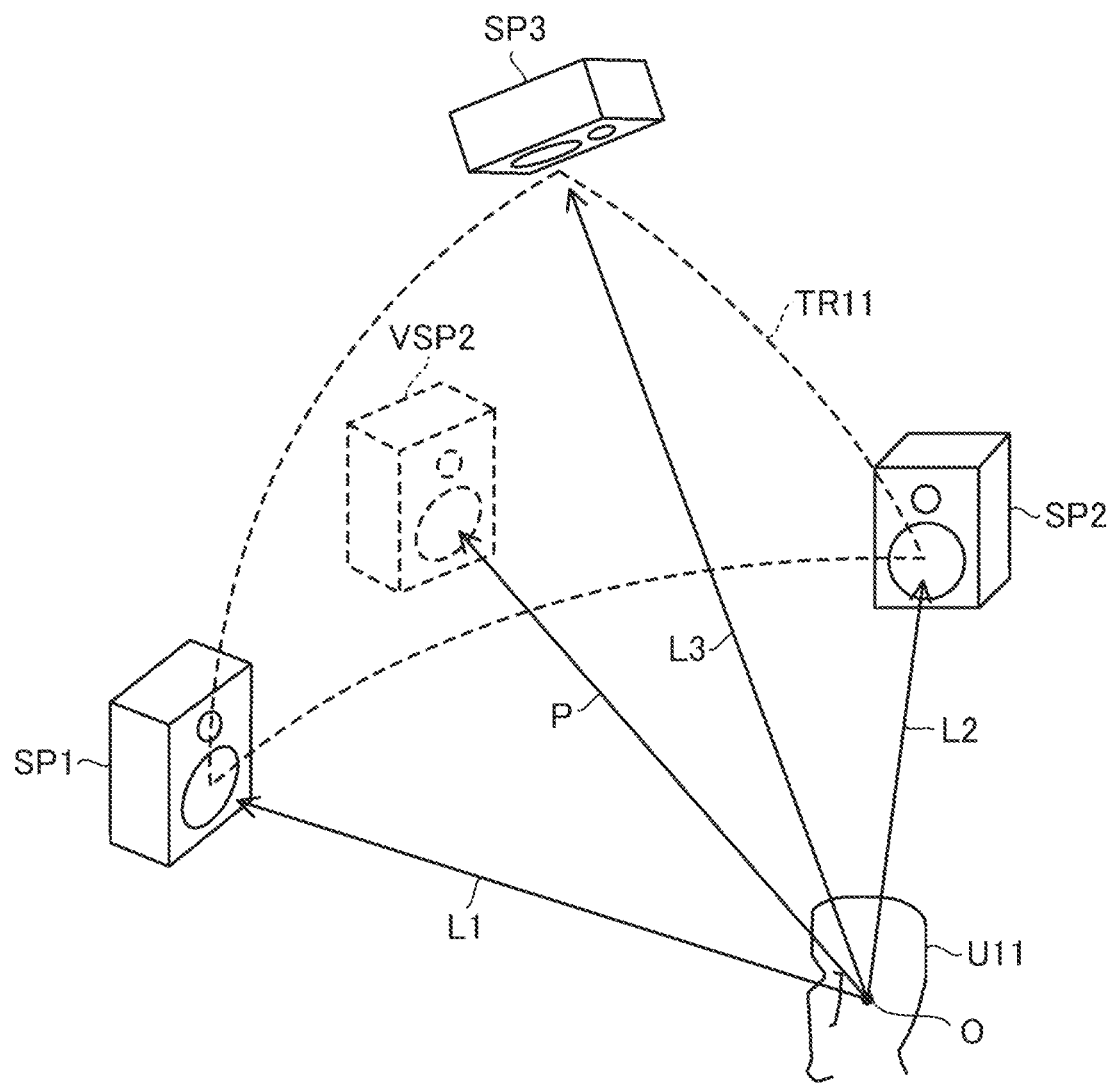
FIG. 2 is a diagram for describing three-dimensional VBAP that is a kind of panning processing.

FIG. 2 is a diagram for describing a three-dimensional VBAP. It is assumed that a viewing position U11 is set as an origin O and sounds are output from an audio object VSP2 present on the spherical surface in the three-dimensional space. Provided that the position of the audio object VSP2 is a vector P starting from the origin O (viewing position U11), the vector P can be represented by distributing the gains to speakers SP1, SP2, and SP3 on the same spherical surface as the audio object VSP2. Therefore, the vector P can be expressed as in Equation (1) by using vectors L1, L2, and L3 representing the positions of the respective speakers SP1, SP2, and SP3.

$$P = g1*L1 + g2*L2 + g3*L3 \quad (1)$$

Here, provided that g1, g2, and g3 represent gains for the speakers SP1, SP2, and SP3, respectively, and g123=[g1 g2 g3 and L123=[L1 L2 L3, Equation (1) can be expressed by Equation (2) below.

$$g123 = P^T L123^{-1} \quad (2)$$

The rendering can be performed by distributing the audio object signals to the respective speakers SP1, SP2, and SP3 with the thus determined gains. Since the arrangement of the speakers SP1, SP2, and SP3 is fixed and is known information, the inverse matrix $L123^{-1}$ can be determined in advance and can be processed with a relatively low computational complexity.

In such a panning technique, it is possible to increase the spatial resolution by arranging a large number of speakers in the space. However, unlike a movie theater, it is often difficult to arrange a large number of speakers in the space of an ordinary house. It is known that in such a case, reproduction signals of a large number of virtual speakers arranged in the space can be reproduced in an auditory approximation with a small number of speakers arranged in the real space by transaural processing using a head-related transfer function.

On the other hand, the head-related transfer function used for the transaural processing greatly varies depending on the head and ear shapes. Therefore, the head-related transfer function used for the transaural processing and binaural processing for headphones currently existing in the market is created by inserting microphones into ear holes of a dummy head with an average human face shape and measuring impulse responses. In reality, the mean head-related transfer function is, however, insufficient because it depends on the shape and arrangement of the face, ears, and the like which differ from individual to individual, and it is difficult to faithfully reproduce the sound field.

The audio system according to this embodiment has been made in view of such circumstances, and one object thereof is to acquire face data from an image acquired by a camera by using a face recognition technique and faithfully reproduce a sound field for each individual person by using a personalized head-related transfer function in accordance with the acquired face data. Hereinafter, various embodiments of the audio system according to this embodiment will be described.

2. Embodiment

Figure 3:
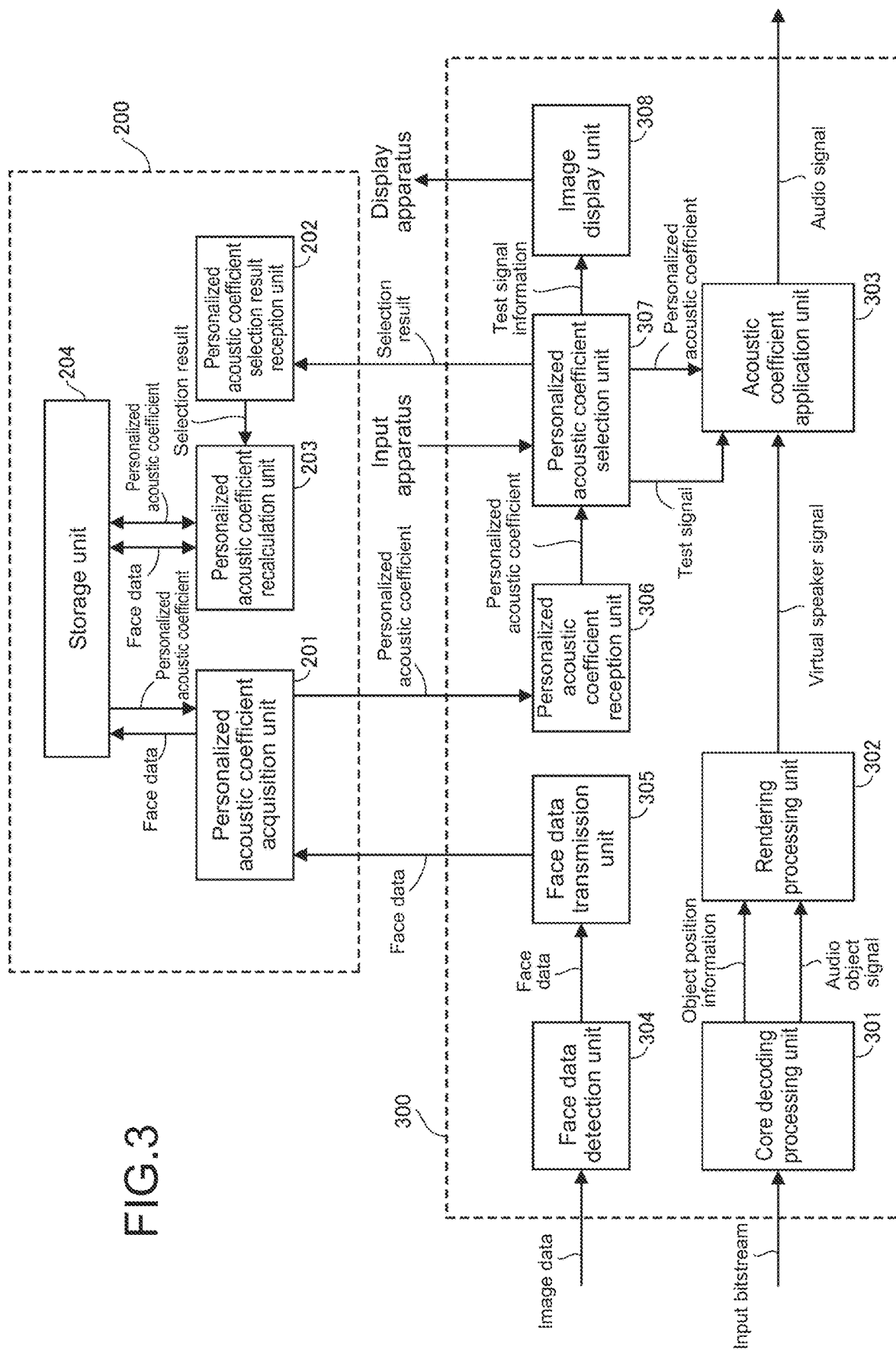
FIG. 3 is a block diagram showing an audio system according to this embodiment.

FIG. 3 is a block diagram showing audio system according to this embodiment. The audio system includes a reproduction apparatus 300 that outputs an audio signal and a server apparatus 200. The reproduction apparatus 300 and the server apparatus 200 are communicably connected to each other via various communication lines such as the Internet. First, an audio reproduction function of the reproduction apparatus 300 will be described.

The audio reproduction function in the reproduction apparatus 300 is realized by a core decoding processing unit 301, a rendering processing unit 302, and an acoustic coefficient application unit 303. The core decoding processing unit 301 has a function similar to that of the core decoding processing unit 101 described above with reference to FIG. 1, decodes an input bit stream, and outputs an audio object signal and object position information (meta information). The rendering processing unit 302 has a function similar to that of the rendering processing unit 102 described above with reference to FIG. 1. In the rendering processing unit 302, panning processing like the VBAP described above, for example, is performed and a virtual speaker signal is output. The acoustic coefficient application unit 303 outputs an audio signal by applying various acoustic coefficients to the input virtual speaker signal.

Next, a method for acquiring various acoustic coefficients to be applied by the acoustic coefficient application unit 303 will be described. The reproduction apparatus 300 according to this embodiment is capable of acquiring image data obtained by imaging a user who is a listener. The image data can be acquired from various information devices communicably connected to the reproduction apparatus 300, for example, a TV, a smart speaker, a personal computer, and the like. These information devices are each equipped with a camera and capable of imaging the state of the user listening to an audio signal reproduced by the reproduction apparatus 300. It should be noted that an embodiment on which the camera is directly communicably connected to the reproduction apparatus 300 to acquire image data rather than communicably connecting the information device equipped with the camera to the reproduction apparatus 300 may be employed.

Moreover, a display apparatus for displaying various types of information can be connected to the reproduction apparatus 300 according to this embodiment. The reproduction apparatus 300 displays various types of information, to thereby enable the user to select an acoustic coefficient. Moreover, an input apparatus for selecting the acoustic coefficient is also connected to the reproduction apparatus 300. Other than a remote control device, a keyboard, or a mouse, a smartphone owned by the user may be communicably connected and used as the input apparatus.

Figure 4:
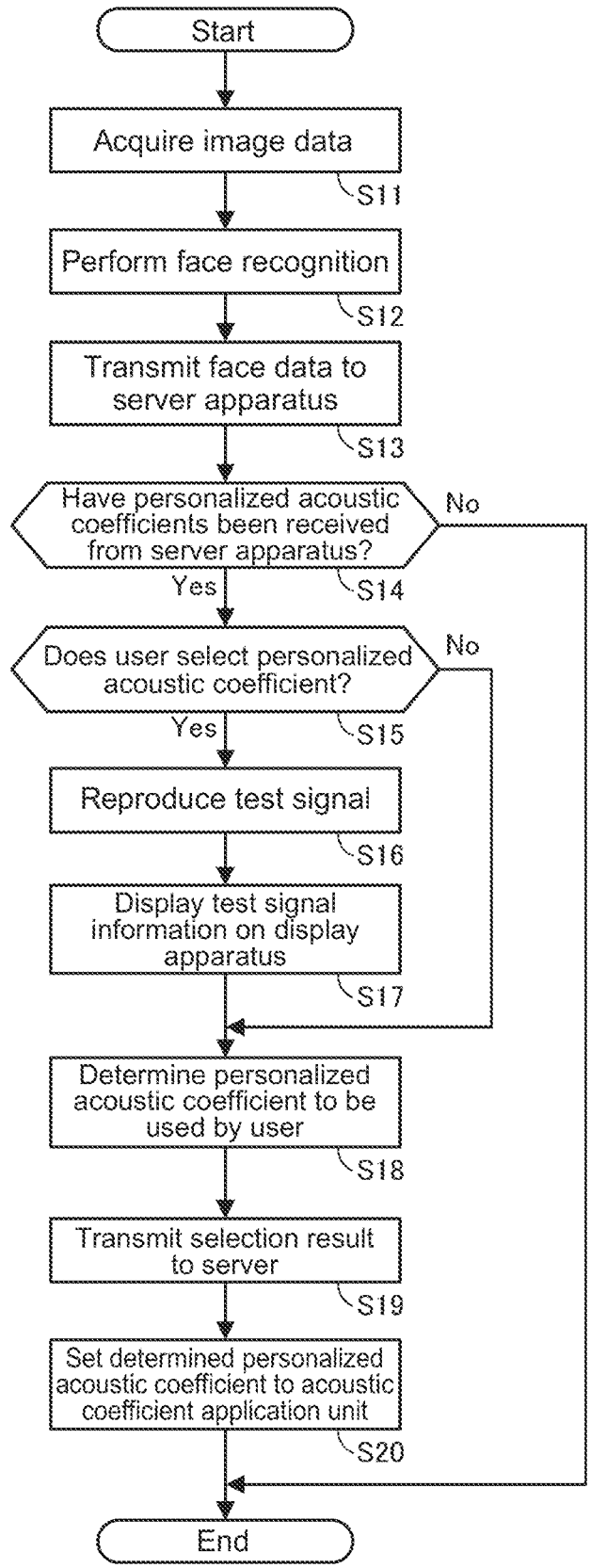
FIG. 4 is a flowchart showing personalized acoustic coefficient setting processing according to this embodiment.

Next, a method for obtaining the personalized acoustic coefficient used in the reproduction apparatus 300 will be described with reference to the flowchart of FIG. 4. FIG. 4 is a flowchart showing personalized acoustic coefficient setting processing used in the reproduction apparatus 300.

In the personalized acoustic coefficient setting processing performed by the reproduction apparatus 300, the image data is first input into a face data detection unit 304 (S11) and the face data detection unit 304 performs face recognition processing on the basis of the image data (S12). The face data detection unit 304 detects and outputs face data on the basis of the recognition result. A commonly used technology can be applied to the face recognition processing. It should be noted that the face data may be a face portion extracted from the image data, or various forms such as face feature quantities such as the outline of the face and the positions and sizes of eyes, ears, and nose can be employed. Moreover, the face data may include the position of the user in a listening space or the direction in which the user is facing.

The face data as the recognition result is transmitted to the server apparatus 200 (S13). It is performed by a face data transmission unit 305. The transmission to the server apparatus 200 is not limited to physically wired or wireless transmission and any medium can be used therefor. Moreover, a light lossy compression technique in which matching can be performed on the basis of a large number of pieces of face data on the server apparatus 200 may be used for the logical format in addition to lossless compressed and uncompressed formats.

Here, a method for outputting the personalized acoustic coefficient from the face data received on the server apparatus 200 will be described later, and the description will be continued on the assumption that the personalized acoustic coefficient is transmitted from the server apparatus 200. In Step S14, the reproduction apparatus 300 determines whether one or more acoustic coefficients have been received from the server apparatus 200 (S14). It is performed by a personalized acoustic coefficient reception unit 306. In a case where the personalized acoustic coefficient cannot be received within a predetermined period after the face data is transmitted, the timeout is performed and the personalized acoustic coefficient setting processing is terminated.

On the other hand, in a case where the personalized acoustic coefficients have been received from the server apparatus 200 (S14: Yes), the user can select the received personalized acoustic coefficient. This processing is performed by a personalized acoustic coefficient selection unit 307. The user is selected by an input apparatus connected to the reproduction apparatus 300. In this embodiment, the server apparatus 200 transmits at least one personalized acoustic coefficient candidate in addition to a default personalized acoustic coefficient. Therefore, the user can select whether to use the default personalized acoustic coefficient or the personalized acoustic coefficient candidate. In a case where the user selects a personalized acoustic coefficient (S15: Yes), the reproduction apparatus 300 reproduces a test signal (S16) and causes the display apparatus to display test signal information (S17). The user reproduces the test signal and listens to the audio signal output from the speaker while switching the personalized acoustic coefficient.

Figure 7:
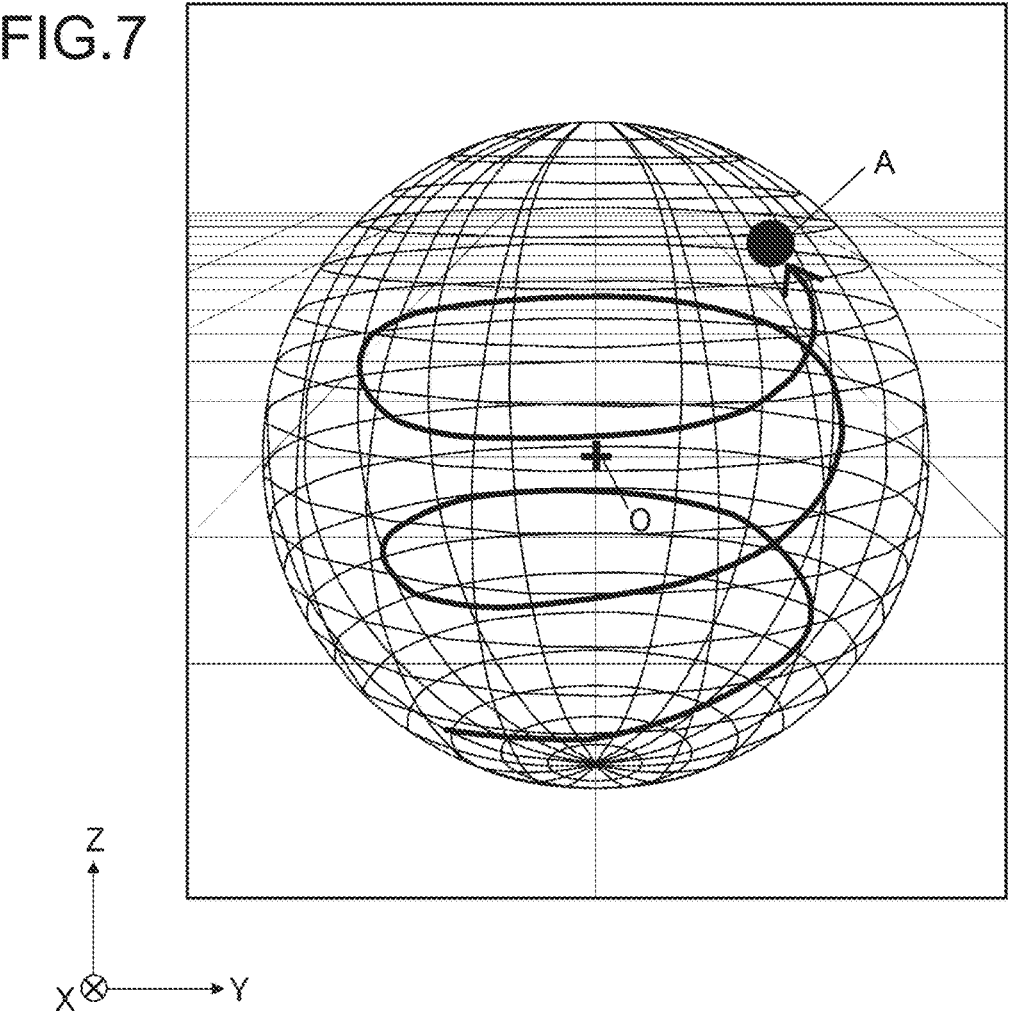
FIG. 7 is a diagram showing a state in which test signal information is displayed.

FIG. 7 shows an example of the test signal information displayed on the display apparatus. An image display unit 308 causes the display apparatus to display an image based on the test signal information. In this embodiment, a moving sound source A is displayed on the basis of the position information, using the origin O as the center. At that time, the reproduction apparatus 300 outputs an audio signal based on the test signal such that localization is achieved at the position information of the moving sound source A, using the user's viewing position as the origin O. Here, it is assumed that the user faces the positive direction of the X-axis. At that time, the received personalized acoustic coefficient is used in the acoustic coefficient application unit 303. The user determines whether or not the personalized acoustic coefficient is suitable on the basis of the position of the moving sound source A displayed on the display apparatus and the sound that the user is listening to (in particular, localization). FIG. 7 shows a trajectory of the moving sound source A by the arrow. As it can be seen from the figure, the moving sound source A takes a trajectory to rise while circulating around the origin O in this example. In this case, the user listens to the localized sound rising while circulating around the user.

In this embodiment, the default personalized acoustic coefficient and the at least one personalized acoustic coefficient candidate are used for enabling the user to select a suitable personalized acoustic coefficient. The user uses the input apparatus for selecting the personalized acoustic coefficient as the candidate as appropriate and determining a suitable personalized acoustic coefficient (S18). On the other hand, in a case where the personalized acoustic coefficient is not selected (S15: No), the received default personalized acoustic coefficient is used (S18). The selection result of the personalized acoustic coefficient is transmitted to the server apparatus 200 (S19). Then, the reproduction apparatus 300 sets the determined personalized acoustic coefficient to the acoustic coefficient application unit 303 (S20).

The above is the details of the personalized acoustic coefficient setting processing performed in the reproduction apparatus 300. In this embodiment, by using the personalized acoustic coefficient received from the server apparatus 200 in accordance with the transmitted face data, it is possible to reproduce a sound field with the personalized acoustic coefficient suitable for the face data and faithfully reproduce the sound field. Moreover, by allowing the user to select a personalized acoustic coefficient, the user can use a more suitable personalized acoustic coefficient. Then, by transmitting the determination result of the user to the server apparatus 200, the server apparatus 200 can perform learning processing using the determination result and provide the personalized acoustic coefficient with higher accuracy.

Figure 5:
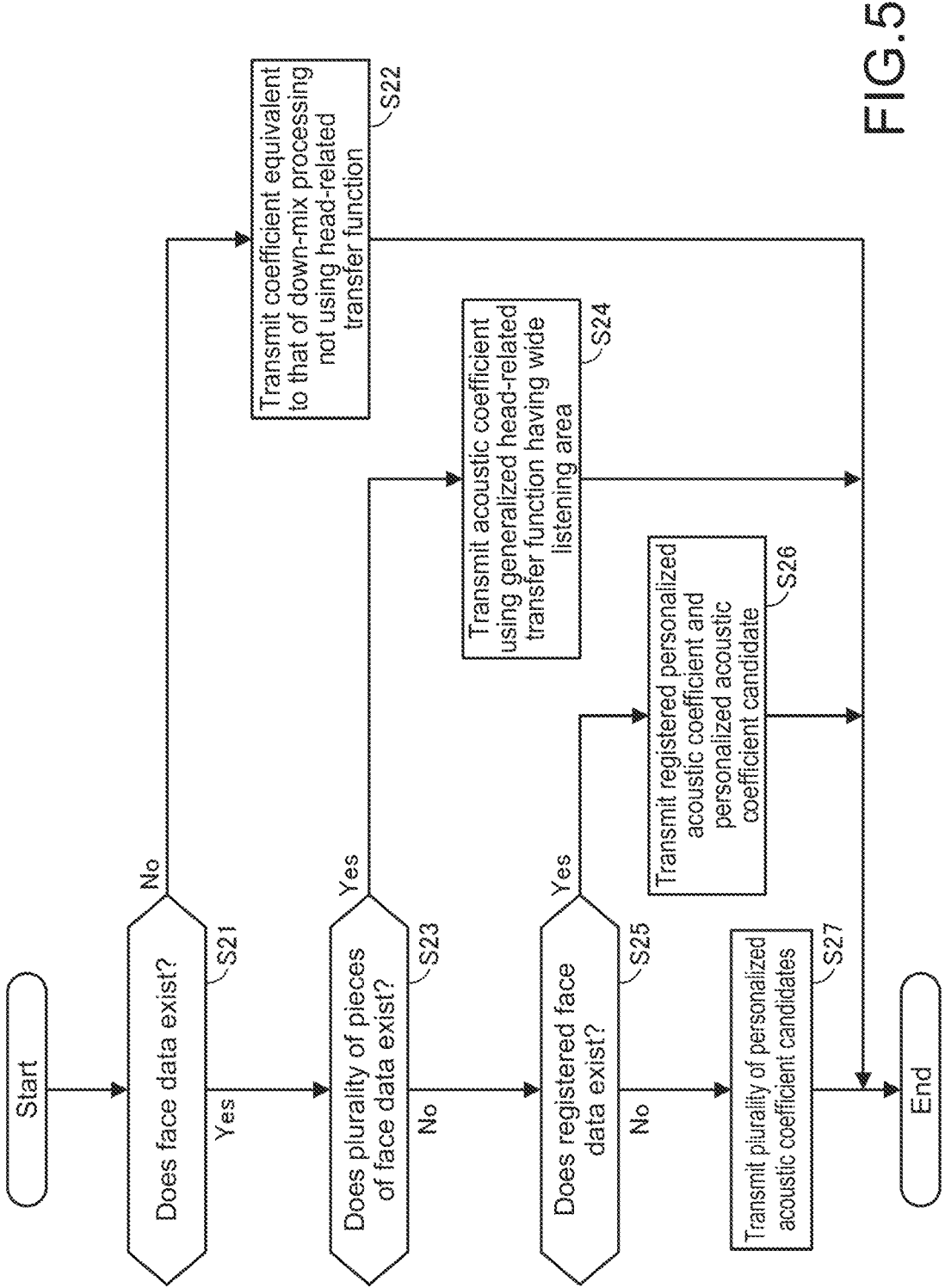
FIG. 5 is a flowchart showing personalized acoustic coefficient acquisition processing according to this embodiment.
Figure 6:
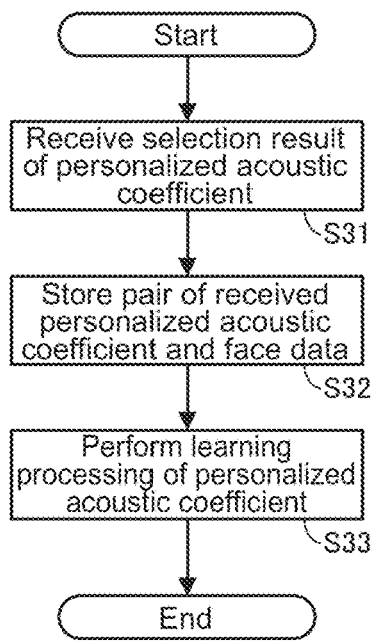
FIG. 6 is a flowchart representing personalized acoustic coefficient recalculation processing according to this embodiment.

Next, processing on the server apparatus 200 side will be described with reference to the flowcharts of FIGS. 5 and 6. FIG. 5 is a flowchart showing personalized acoustic coefficient acquisition processing performed by the server apparatus 200. The server apparatus 200 receives the face data transmitted from the reproduction apparatus 300 for starting the personalized acoustic coefficient acquisition processing. Here, a head-related transfer function is used as the personalized acoustic coefficient according to this embodiment. It is possible to reproduce a sound field suitable for each individual person by using a head-related transfer function according to a feature quantity of each of various individual people based on the face data. It should be noted that the reception of the face data and the transmission of the personalized acoustic coefficient are performed by a personalized acoustic coefficient acquisition unit 201. When the personalized acoustic coefficient acquisition processing is started, it is determined whether or not the received face data exists in a storage unit 204 in Step S21.

In a case where the face data does not exist (S21: No), a coefficient equivalent to that of down-mix processing not using the head-related transfer function is transmitted as the personalized acoustic coefficient (S22). It should be noted that the down-mix processing set forth herein means, for example, processing for obtaining a mono signal by multiplying each channel of stereo by 0.5 and adding it when converting from stereo to mono. After transmitting the personalized acoustic coefficient (S22), the personalized acoustic coefficient acquisition processing is terminated.

On the other hand, in a case where the face data exists (S21: Yes), it is determined whether or not a plurality of pieces of face data exists (S23). Here, the presence of the plurality of pieces of face data is equivalent to the presence of a plurality of users who does listening with the reproduction apparatus 300. In a case where the plurality of pieces of face data exists (S23: Yes), a coefficient using a generalized head-related transfer function having a wide listening area is transmitted as the personalized acoustic coefficient in the processing of S24 (S24). It should be noted that existing techniques can be used for the processing of expanding the listening area. Moreover, the generalized head-related transfer function set forth herein means a function obtained by measurement in which microphones are inserted into ear holes of a model called dummy head simulating the shapes of typical human face and ear. After transmitting the personalized acoustic coefficient (S24), the personalized acoustic coefficient acquisition processing is terminated. It should be noted that in a case where the face data contains position information of each user, it is possible to set the positions of all the users as listening areas and determine them as personalized acoustic coefficients.

Next, in a case where the plurality of pieces of face data does not exist (S23: No), the server apparatus 200 determines whether or not the registered face data exists in the storage unit 204 (S25). Specifically, the personalized acoustic coefficient acquisition unit 201 accesses the storage unit 204 and determines whether or not the input face data has been registered. In a case where the face data exists (S25: Yes), the personalized acoustic coefficient associated with the face data is transmitted as the default personalized acoustic coefficient. Moreover, in this embodiment, at least one personalized acoustic coefficient candidate is transmitted together with the default personalized acoustic coefficient. Accordingly, a plurality of personalized acoustic coefficients including the default personalized acoustic coefficient is transmitted to the reproduction apparatus 300 (S26). Here, the personalized acoustic coefficient as a candidate is a personalized acoustic coefficient different from the default personalized acoustic coefficient, and is determined on the basis of the received face data or determined by a method for adjusting the default personalized acoustic coefficient, for example.

On the other hand, in a case where the face data does not exist in the storage unit 204 (S25: No), a plurality of personalized acoustic coefficients is determined and transmitted by analyzing the input face data (S27). For example, inputting the face data into a neural network having learning coefficients obtained by machine learning and transmitting a plurality of personalized acoustic coefficient candidates in the order of likelihood are conceivable as a method for analyzing the face data. In the reproduction apparatus 300, the highest personalized acoustic coefficient in the order of likelihood is set by default. It should be noted that the acquisition of the personalized acoustic coefficient for the unknown face data is also used when transmitting the candidates other than the registered personalized acoustic coefficient in S26.

Next, personalized acoustic coefficient recalculation processing will be described with reference to the flowchart of FIG. 6. The personalized acoustic coefficient recalculation processing is processing performed by the server apparatus 200 and is processing performed on the basis of the selection result of the personalized acoustic coefficient transmitted from the reproduction apparatus 300. In Step S31, the server apparatus 200 receives the selection result of the personalized acoustic coefficient transmitted from the reproduction apparatus 300 (S31). This processing is performed in a personalized acoustic coefficient selection result reception unit 202 of FIG. 3.

In the personalized acoustic coefficient setting processing described above with reference to FIG. 4, the server apparatus 200 receives the selection result together with the face data. In Step S32, the server apparatus 200 records the pair of the personalized acoustic coefficient and the face data received in the personalized acoustic coefficient setting processing in the storage unit 204 (S32). In Step S33, learning processing is performed using the pair of the personalized acoustic coefficient and the face data stored in the storage unit 204 (S33). Here, the learning processing is machine learning processing for updating the determination algorithm of the personalized acoustic coefficients based on the face data, and an existing method such as a convolution neural network (CNN) or a recurrent neural network (RNN) known as deep neural networks can be applied as the machine learning processing. The updated determination algorithm of the personalized acoustic coefficient is used when generating the personalized acoustic coefficient candidates described in FIG. 5.

As described above, in the personalized acoustic coefficient recalculation processing, the plurality of personalized acoustic coefficients is transmitted on the basis of the face data such that the user can select a personalized acoustic coefficient, and thus a personalized acoustic coefficient suitable for the user can be used. Furthermore, it is possible to provide a more suitable personalized acoustic coefficient by learning the relationship between the face data and the personalized acoustic coefficient on the basis of the selection result.

It should be noted that although the default personalized acoustic coefficient and the personalized acoustic coefficient as the candidate are transmitted in this embodiment, an embodiment to be described below can be employed instead of such an embodiment. In this embodiment, the server apparatus 200 transmits only the default personalized acoustic coefficient. On the reproduction apparatus 300 side, the user can use the input apparatus to adjust the received default personalized acoustic coefficient. In the personalized acoustic coefficient setting processing, the adjusted result is transmitted to the server apparatus 200 as the selection result. The server apparatus 200 performs learning processing on the basis of the pair of the selection result and the face data to thereby determine the determination algorithm of the personalized acoustic coefficient. It should be noted that it is also possible to use this adjustment of the personalized acoustic coefficient as well as the selection from among the plurality of personalized acoustic coefficients described above.

In accordance with at least the embodiment of the present disclosure, it is possible to form a sound field suitable for the user by applying the acoustic coefficient according to the face data of the user who does listening to the audio signal. It should be noted that the effects described here are not necessarily limited and any of the effects described in the present disclosure may be provided. Moreover, the contents of the present disclosure should not be construed as being limited due to the shown effects.

The present disclosure may also be implemented as an apparatus, a method, a program, a system, or the like. For example, a program for performing the functions described in the above embodiment is made downloadable, and an apparatus not having the functions described in the embodiment can perform the control described in the embodiment in the apparatus by downloading the program. The present disclosure can also be implemented as a server that distributes such a program. Moreover, the matters described in the respective embodiment and modified examples can be combined as appropriate.

The present disclosure can also take the following configurations.

(1) An audio system, including:
 a face data detection unit that detects face data on the basis of input image data;
 an acoustic coefficient acquisition unit that outputs an acoustic coefficient associated with face data output from the face data detection unit; and
 an acoustic coefficient application unit that performs, on an audio signal, acoustic processing based on an acoustic coefficient acquired by the acoustic coefficient acquisition unit.

(2) The audio system according to (1), in which
 the acoustic coefficient is a head-related transfer function.

(3) The audio system according to (1) or (2), in which
 the acoustic coefficient acquisition unit outputs, in a case where an individual person associated with input face data has been registered, an acoustic coefficient associated with the individual person as the acoustic coefficient.

(4) The audio system according to any one of (1) to (3), in which
 the acoustic coefficient acquisition unit outputs, in a case where an individual person associated with input face data has not been registered, an acoustic coefficient on the basis of an analysis result of the input face data.

(5) The audio system according to any one of (1) to (4), in which
 the acoustic coefficient acquisition unit outputs a plurality of acoustic coefficients.

(6) The audio system according to (5), in which
 the acoustic coefficient acquisition unit outputs, in a case where an individual person associated with input face data has been registered, an acoustic coefficient associated with the individual person and at least one acoustic coefficient as a candidate.

(7) The audio system according to (5) or (6), in which
 the acoustic coefficient acquisition unit outputs, in a case where an individual person associated with input face data has not been registered, a plurality of acoustic coefficients as candidates.

(8) The audio system according to any one of (1) to (7), in which
 the acoustic coefficient acquisition unit outputs, in a case where the face data detection unit has detected a plurality of pieces of face data, an acoustic coefficient having a wide listening area.

(9) The audio system according to (8), in which
 the acoustic coefficient acquisition unit outputs the acoustic coefficient having the wide listening area on the basis of a position of the detected face data.

(10) The audio system according to any one of (5) to (9), further including:
 a selection unit that enables a user to select one of the plurality of acoustic coefficients output; and
 an acoustic coefficient recalculation unit that performs learning processing on the basis of a selection result in the selection unit and face data used in the acoustic coefficient acquisition unit.

(11) The audio system according to any one of (5) to (10), further including:
 a selection unit that enables a user to select one of the plurality of acoustic coefficients output; and
 an image display unit that displays an object on the basis of position information, in which
 the acoustic coefficient application unit performs sound localization on an audio signal and outputs the audio signal on the basis of the position information of the displayed object.

(12) An audio reproduction apparatus, including:
 a face data detection unit that detects face data on the basis of the input image data; and
 an acoustic coefficient application unit that performs, on an audio signal, acoustic processing based on an acoustic coefficient associated with the face data.

(13) The audio reproduction apparatus according to (12), further including:
 a transmission unit that transmits the detected face data to a server apparatus; and
 a reception unit that receives the acoustic coefficient associated with the face data.

(14) A server apparatus, including:
 a reception unit that receives face data transmitted from an audio reproduction apparatus; and
 an acoustic coefficient acquisition unit that outputs the face data; in which
 the server apparatus transmits an acoustic coefficient output by the acoustic coefficient acquisition unit to the audio reproduction apparatus.

(15) An audio reproduction method, including:
 face data detection processing of detecting face data on the basis of input image data; and
 acoustic coefficient application processing of performing, on an audio signal, acoustic processing based on an acoustic coefficient associated with the face data.

(16) An audio reproduction program that causes an information processing apparatus to perform:

face data detection processing of detecting face data on the basis of input image data; and acoustic coefficient application processing of performing, on an audio signal, acoustic processing based on an acoustic coefficient associated with the face data.

REFERENCE SIGNS LIST 100 reproduction apparatus
101 core decoding processing unit
102 rendering processing unit
103 head-related transfer function processing unit
200 server apparatus
201 personalized acoustic coefficient acquisition unit
202 personalized acoustic coefficient selection result reception unit
204 storage unit
300 reproduction apparatus
301 core decoding processing unit
302 rendering processing unit
303 acoustic coefficient application unit
304 face data detection unit
305 face data transmission unit
306 personalized acoustic coefficient reception unit
307 personalized acoustic coefficient selection unit
308 image display unit

The invention claimed is:

1. An audio system, comprising:
processing circuitry configured to:
detect face data on a basis of input image data;
supply an acoustic coefficient associated with the face data; and
perform, on an audio signal, acoustic processing based on the acoustic coefficient, wherein, in a case where a plurality of pieces of face data are detected, the acoustic coefficient has a wide listening area based on a position of the detected face data.

2. The audio system according to claim 1, wherein the acoustic coefficient is a head-related transfer function.

3. The audio system according to claim 1, wherein the processing circuitry is configured to supply, in a case where an individual person associated with input face data has been registered, an acoustic coefficient associated with the individual person as the acoustic coefficient.

4. The audio system according to claim 1, wherein the processing circuitry is configured to supply, in a case where an individual person associated with input face data has not been registered, an acoustic coefficient on a basis of an analysis result of the input face data.

5. The audio system according to claim 1, wherein the processing circuitry is configured to supply a plurality of acoustic coefficients.

6. An audio system, comprising:
processing circuitry configured to:
detect face data on a basis of input image data;
supply an acoustic coefficient associated with the face data; and
perform, on an audio signal, acoustic processing based on the acoustic coefficient, wherein the processing circuitry is configured to supply a plurality of acoustic coefficients, and to supply, in a case where an individual person associated with input face data has been registered, an acoustic coefficient associated with the individual person and at least one acoustic coefficient as a candidate.

7. The audio system according to claim 5, wherein the processing circuitry is configured to supply, in a case where an individual person associated with input face data has not been registered, a plurality of acoustic coefficients as candidates.

8. The audio system according to claim 5, wherein the processing circuitry is further configured to enable a user to select one of the plurality of acoustic coefficients output; and to perform learning processing on a basis of a selection result in the selection unit and face data used in the acoustic coefficient acquisition unit.

9. The audio system according to claim 5, wherein the processing circuitry is further configured to enable a user to select one of the plurality of acoustic coefficients output; and to control display of an object on a basis of position information, wherein the processing circuitry performs sound localization on an audio signal and outputs the audio signal on a basis of the position information of the displayed object.

10. An audio reproduction apparatus, comprising:
processing circuitry configured to:
detect face data on a basis of the input image data; and
perform, on an audio signal, acoustic processing based on an acoustic coefficient associated with the face data, wherein, in a case where a plurality of pieces of face data are detected, the acoustic coefficient has a wide listening area based on a position of the detected face data.

11. The audio reproduction apparatus according to claim 10, wherein the processing circuitry is further configured to transmit the detected face data to a server apparatus and receive the acoustic coefficient associated with the face data.

12. A server apparatus, comprising:
processing circuitry configured to:
receive face data transmitted from an audio reproduction apparatus; and
supply an acoustic coefficient based on the face data wherein
the server apparatus transmits the acoustic coefficient to the audio reproduction apparatus, and wherein, in a case where a plurality of pieces of face data are received, the acoustic coefficient has a wide listening area based on a position of the received face data.

13. An audio reproduction method executed by processing circuitry, the method comprising:
detecting face data on a basis of input image data; and
performing, on an audio signal, acoustic processing based on an acoustic coefficient associated with the face data, wherein, in a case where a plurality of pieces of face data are detected, the acoustic coefficient has a wide listening area based on a position of the detected face data.

14. A non-transitory computer readable medium storing instructions that, when executed by processing circuitry, perform an audio reproduction method comprising:
detecting face data on a basis of input image data; and
performing, on an audio signal, acoustic processing based on an acoustic coefficient associated with the face data, wherein, in a case where a plurality of pieces of face data are detected, the acoustic coefficient has a wide listening area based on a position of the detected face data.

* * * * *